Figure 1:
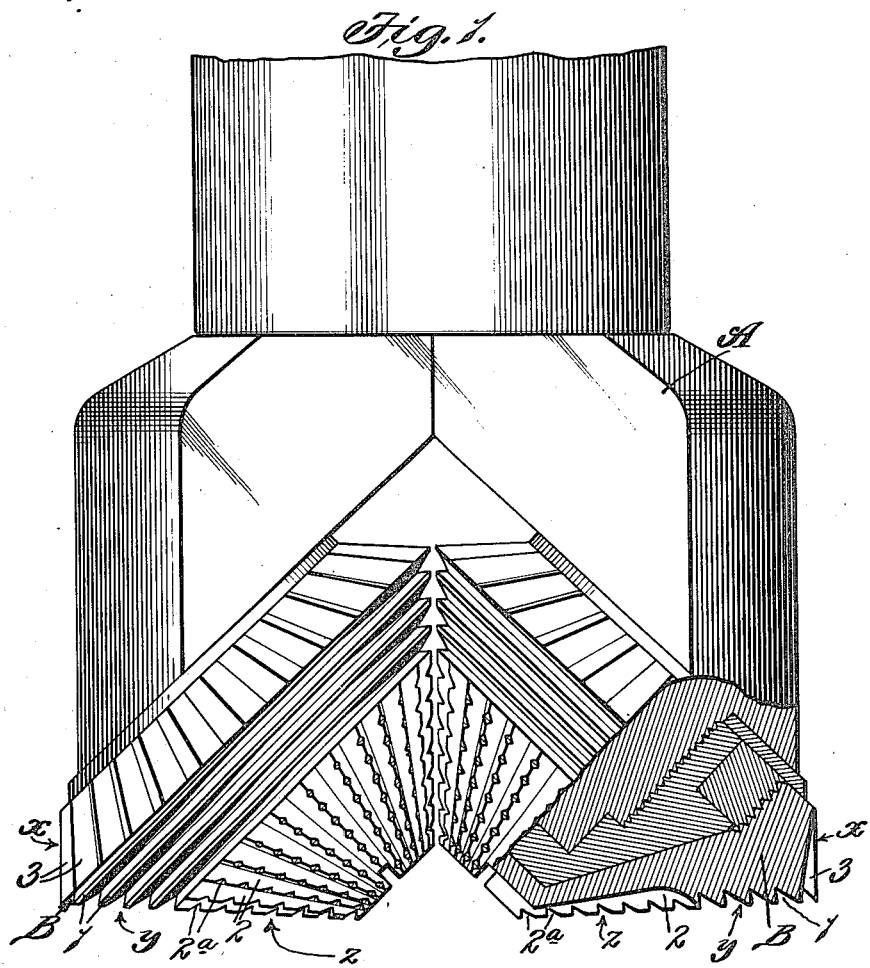

H. R. HUGHES.
CUTTER FOR ROTARY BORING DRILLS.
APPLICATION FILED FEB. 24, 1914.

1,143,271.

Patented June 15, 1915.

Witnesses:
Geo. R. Ladson
C. M. Badger

Inventor,
Howard R. Hughes.
By Bakewell & Church Attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

CUTTER FOR ROTARY BORING-DRILLS.

1,143,271.    Specification of Letters Patent.    Patented June 15, 1915.

Application filed February 24, 1914. Serial No. 820,676.

*To all whom it may concern:*

Be it known that I, HOWARD R. HUGHES, a citizen of the United States, residing at Houston, Texas, have invented a certain new and useful Improvement in Cutters for Rotary Boring-Drills, of which the following is a full, clear, and exact description, such as will enable others skilled in the art to which it appertains to make and use the same.

This invention relates to rotary boring drills of the type illustrated in my prior Patent No. 930,759, dated August 10, 1909, in which the cutting means consists of approximately frusto-conical-shaped cutters that are mounted on the head of the drill in such a manner that their axes of rotation are inclined downwardly and inwardly toward the longitudinal center of the drill head.

In developing and perfecting the type of drill illustrated in my prior patent above-referred to I formed the cutting surfaces on the cutters in various ways with a view of obtaining an efficient cutting surface of great area that would not wear away quickly when the drill was in use, and after numerous exhaustive tests I adopted as a standard construction a substantially frusto-conical-shaped cutter whose cutting surface is composed of chisel-teeth that radiate from the inner end or small end of the cutter in substantially the manner illustrated in my said prior patent. While a cutting surface of the character mentioned is efficient in that the chisel-teeth obtain a firm grip on the bottom of the hole being formed, the objectionable feature of such a cutter is that the outer end portions of the chisel-teeth which act on the outer portion of the bottom of the hole, wear down quickly on account of the relatively greater amount of work that these portions of the teeth have to do, owing to the fact that the zone on which they act is of greater diameter than the zone on which the remaining portion or inner portion of the teeth act. In other words, the inner half of the chisel-teeth travel over a circular zone of much less diameter than the circular zone over which the outer half of the chisel-teeth travel, and as the number of chisel-teeth in the outer half of the cutter is the same as the number of chisel-teeth in the inner half of the cutter the outer half of the chisel-teeth naturally wear down faster than the inner half of the teeth. Furthermore, the cutting edges of the teeth in the outer half of the cutter are spaced farther apart than the cutting edges of the teeth in the inner half of the cutter, notwithstanding the fact that the outer half of the teeth cut an area of much greater diameter. The result is that the outer end portions of the chisel-teeth on an approximately frusto-conical-shaped cutter wear away more quickly than the remaining portion of the teeth, thereby causing the outer portion of the cutter to merely rub on the bottom of the hole without cutting same, and, consequently, preventing the unworn portions of the teeth from acting efficiently or from disintegrating the material as effectively as they would if the outer portion of the cutter did not rub on the bottom of the hole. In large cutters this action is more pronounced, and, furthermore, there is a tendency for the outer end portions of the teeth of a large cutter to break off easily owing to the fact that the outer end portions of the teeth are deeper than the inner end portions of the teeth.

The object of my present invention is to overcome the objectionable features above-mentioned and produce an efficient frusto-conical-shaped cutter whose outer end portion will not wear down quickly, and to this end I have devised a cutter which is provided at its outer end portion with a cutting surface that consists of a plurality of spiral teeth or a continuous tooth that extends spirally around the cutter a number of times, the cutting surface on the inner end portion of the cutter preferably consisting of radially-disposed chisel-teeth, sharp-pointed projections, or any other suitable type of cutting surface that will insure the cutter obtaining a firm grip on the bottom of the hole. By constructing the cutter in this manner I not only greatly increase the area of the cutting surface and provide an exceptionally large cutting surface where it is most needed, but I eliminate the tendency of the cutter to break, especially in large cutters, and I reduce the cost of manufacturing the cutter.

Figure 2:
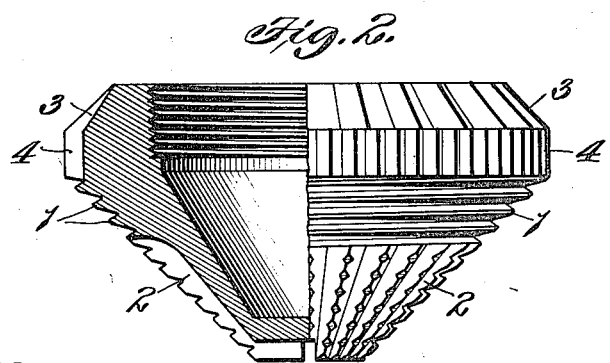

Figure 1 of the drawings is a side elevational view of a rotary boring drill equipped with cutters constructed in accordance with my invention, one of the cutters being broken away; and Fig. 2 is a side elevational view, partly broken away, of a cutter embodying my invention but constructed in a different manner from the cutters shown in Fig. 1.

Referring to Fig. 1 of the drawings, A designates the head of the drill, and B designates two approximately frusto-conical-shaped cutters rotatably mounted on said head in such a manner that their axes of rotation incline downwardly and inwardly toward the longitudinal axis or vertical center of the drill head. The portion of the cutting surface of each of the cutters B which acts on the outer portion of the bottom of the hole, namely, that portion of the bottom of the hole which is located adjacent the side wall of the hole, consists of a continuous spiral tooth 1 that extends a number of times around the cutter, and the remaining portion of the cutting surface of the cutter that acts on the bottom of the hole is made up of a plurality of radially-disposed chisel-teeth 2, said radially-disposed chisel-teeth either being plain or provided with notches 2$^a$, as herein shown. Each of the cutters B is preferably provided at its base end with an oppositely tapered or beveled portion that has chisel-teeth 3, or any other suitable type of cutting surface, for removing the material from the side wall of the hole so as to maintain sufficient clearance for the drill head. When the drill is in operation the chisel-teeth 2 on the cutters B cut and disintegrate the material at the center portion of the bottom of the hole, and the spiral teeth 1 on said cutters cut and disintegrate the material at the outer portion of the bottom of the hole, the chisel-teeth 2 insuring sufficient traction to prevent slipping of the cutters.

In order to emphasize the superiority of a cutter of the construction above-described over a cutter that is merely provided with straight chisel-teeth that extend radially from the small end of the cutter to the base of the cutter, I will state that in a cutter of the type herein shown, designed for use on a 15" drill, the length of the cutting edge of the continuous spiral tooth 1 is approximately 144" when said tooth extends around the cutter five times; whereas, in a cutter of the same size provided with radially-disposed chisel-teeth that extend to the base the combined length of the portions of the chisel-teeth which cover a corresponding portion of the cutter is only approximately 59". In other words, by forming a continuous spiral tooth on the outer end portion of the cutter, or on the portion of the cutter which acts on the outer portion of the bottom of the hole, instead of having the chisel-teeth 2 extend clear across the face of the cutter, I obtain nearly three times as great a cutting area. The cost of manufacturing a cutter of the construction herein illustrated and described is less than the cost of manufacturing a cutter equipped with radially-disposed chisel-teeth that extend clear across the face of the cutter because less work is required of the cutter on a milling machine; and another desirable feature of such a cutter is that the outer portion of same is stronger and less liable to break owing to the fact that the material in same is not cut away to form deep notches between the radially-disposed chisel-teeth, as in the cutters of this general type heretofore in use.

The cutter can either be formed in the manner shown in Fig. 1 wherein the two oppositely tapered portions of same merge into each other and thus form a hole with a sharp angle or corner at the junction of the bottom and side wall of the hole, or, if desired, the cutter can be provided with a cylindrical-shaped cutting portion 4 arranged intermediate the oppositely tapered base portion of the cutter that acts on the side wall of the hole and the outer portion of the cutter upon which the spiral tooth 1 is formed, so as to form a hole whose side wall and bottom merge into a beveled surface, the cutting surface on the cylindrical-shaped portion 4 of the cutter preferably consisting of chisel-teeth. Or, stated in another way, the two oppositely tapered portions of the cutter can merge into a cylindrical-shaped portion on the cutter that is concentric with the axis of rotation of the cutter so as to eliminate the sharp angle of the cutter B illustrated in Fig. 1 that is formed by the junction of the two portions of the cutter which act on the side wall and on the bottom of the hole.

From the foregoing it will be seen that the complete cutting surface of my improved cutter is made up of a portion $x$ that acts on the side wall of the hole, a portion $y$ formed by a continuous spiral tooth on the base part of the frusto-conical-shaped portion of the cutter that acts on the outer portion of the bottom of the hole, and a portion $z$ which is preferably made up of radially-disposed chisel-teeth on the apex portion of the cutter that acts on the portion of the bottom of the hole which lies inside of the zone or path of the portion $y$ of the cutter. The length of the cutting edge on the portion $y$ is much greater proportionately than the combined length of the cutting edges on the portion $z$, and in view of the fact that the cutting edge on the portion $y$ of the cutter is a spiral tooth that does not track, the material at the outer portion of the bottom of the hole will be cut finely or divided into small particles.

A cutter of the construction previously described can be used for a long period without withdrawing it from the hole, owing to the fact that the portion of same which has the greatest area to cut is provided with a cutting surface of proportionately greater area than the remaining portion of the cutting surface which acts on the bottom of the hole, and which will not wear away quickly and thus cause the cutter to merely rub on the bottom of the hole before the teeth at the inner end portion of the cutter have become dull. The cutter can be manufactured at a low cost in view of the fact that the spiral tooth on same can be produced in an automatic machine and at a lower cost than it would be possible to mill chisel-teeth in this portion of the cutter; and, furthermore, the cutter is exceptionally strong because very little material is removed from the outer portion of same during the operation of forming the continuous spiral tooth 1 on the cutter. While I prefer to provide the inner end portion of the cutter with chisel-teeth, the spiral teeth 1 could, of course, be continued around the inner end portion of the cutter to the apex of same.

Having thus described my invention, what I claim as new and desire to secure by Letters Patent is:

1. A cutter for rotary boring drills having a substantially frusto-conical-shaped cutting surface whose base portion consists of a continuous spiral tooth and whose apex portion is provided with a cutting surface whose cutting portions extend at approximately right angles to said spiral tooth so that they will obtain a firm hold on the material lying inside of the zone on which said spiral tooth acts.

2. A substantially frusto-conical-shaped cutter for rotary boring drills provided at its base end with a continuous spiral tooth that extends a number of times around the cutter, and provided on its apex portion with a cutting surface that comprises cutting portions which form substantially radially disposed cuts in the material at the bottom of the hole lying inside of the zone on which said spiral tooth acts.

3. A rotatable cutter for rotary boring drills provided with a substantially frusto-conical-shaped portion that has projections on the apex portion of same arranged in radially-disposed rows, and a spiral cutting edge on the base portion of same.

4. A rotatable cutter for rotary boring drills provided with a substantially frusto-conical-shaped portion that has chisel-teeth on the apex portion of same, and a spiral cutting edge on the base portion of same, said cutter also having an oppositely tapered cutting portion that acts on the side wall of the hole being formed.

5. A substantially frusto-conical-shaped cutter for rotary boring drills provided at its base end with a cutting surface for acting on the side wall of the hole, a spiral cutting edge on said cutter which acts on the outer portion of the bottom of the hole, and a cutting surface of a different character on the apex portion of the cutter which acts on the material lying inside of the zone on the bottom of the hole on which said spiral cutting edge acts.

6. A substantially frusto-conical-shaped cutter for rotary boring drills provided at its base end with a cutting surface for acting on the side wall of the hole, a spiral cutting edge on said cutter which acts on the outer portion of the bottom of the hole, and radially-disposed chisel-teeth on the apex portion of the cutter.

7. A substantially frusto-conical-shaped cutter for rotary boring drills provided at its base end with a cutting surface for acting on the side wall of the hole, a spiral cutting tooth extending around the base portion of the cutter which acts on the outer portion of the bottom of the hole, and radially-disposed chisel-teeth extending from said spiral tooth to the apex of the cutter, said chisel-teeth having notches formed in the cutting edges of same.

8. A cutter for rotary boring drills provided with a substantially frusto-conical-shaped portion that acts on the bottom of the hole, and an oppositely tapered cutting portion that acts on the side wall of the hole, the large part of said frusto-conical-shaped portion having a spiral cutting edge that extends around and around same, and the apex portion of same being provided with a cutting surface that comprises cutting portions that extend at approximately right angles to said spiral cutting edge so as to obtain a firm grip on the bottom of the hole.

9. A cutter for rotary boring drills provided with a substantially frusto-conical-shaped portion which is provided with a spiral cutting edge that acts on the material at the outer portion of the bottom of the hole, and a cutting surface on said cutter formed by radially-disposed chisel-teeth whose outer ends terminate at the portion of the cutter on which said spiral cutting edge is formed.

10. A cutter for rotary boring drills provided with a substantially frusto-conical-shaped portion that acts on the bottom of the hole, and an oppositely tapered portion having chisel-teeth that act on the side wall of the hole, said frusto-conical-shaped portion having a spiral tooth that extends around and around same adjacent the base end thereof, and straight chisel-teeth that radiate from the apex end or small end of the cutter.

11. A cutter for rotary boring drills provided with a cylindrical-shaped cutting portion that is arranged between two oppositely tapered cutting portions of different lengths, the tapered portion of said cutter which is of the greatest length being provided with a spiral cutting edge that is located adjacent the cylindrical-shaped portion of the cutter, and being provided at its apex end with a cutting surface of a different character which comprises radially-disposed teeth.

12. A cutter for rotary boring drills comprising an approximately frusto-conical-shaped portion having a spiral tooth extending around the base end of same, and radially-disposed chisel-teeth on the apex end of same, a cylindrical-shaped cutting portion at the base of said conical-shaped portion which is provided with chisel-teeth, and an oppositely tapered portion provided with chisel-teeth that act on the side wall of the hole.

13. A rotary boring drill consisting of a head, substantially frusto-conical-shaped cutters on said head whose axes of rotation are inclined downwardly and inwardly toward the longitudinal axis or center of the head, each of said cutters being provided with a spiral cutting tooth that acts on the outer portion of the bottom of the hole, and radially-disposed chisel-teeth that terminate at said spiral tooth and which act on the portion of the bottom of the hole that lies inside of the zone on which said spiral tooth acts.

14. A rotary boring drill consisting of a head, substantially frusto-conical-shaped cutters on said head whose axes of rotation are inclined downwardly and inwardly toward the longitudinal axis or center of the head, each of said cutters being provided with a continuous spiral cutting tooth that acts on the outer portion of the bottom of the hole, radially-disposed chisel-teeth that terminate at said spiral tooth and which act on the portion of the bottom of the hole that lies inside of the zone on which said spiral tooth acts, and cutting surfaces on said cutters which act on the side wall of the hole and thus maintain sufficient clearance for the drill head.

15. A cutter for rotary boring drills consisting of a substantially frusto-conical-shaped member provided on its outer surface with a cutting tooth that extends spirally around said member a number of times and also having a separate and distinct cutting surface of a different character which comprises a plurality of substantially radially-disposed teeth that insure a firm grip of the cutter on the bottom of the hole.

16. A cutter for rotary boring drills consisting of a substantially frusto-conical-shaped member whose base portion is provided with a continuous tooth that extends spirally around said member and whose apex portion is provided with a cutting surface of a different character whose cutting edges are disposed at approximately right angles to said spiral tooth, and an oppositely tapered portion at the base end of said member which cuts the material on the side wall of the hole.

In testimony whereof I hereunto affix my signature in the presence of two witnesses, this 13" day of February 1914.

HOWARD R. HUGHES.

Witnesses:
HARRY B. HAGENOT,
E. E. WRIGHT.